United States Patent

[11] 3,591,895

[72] Inventors Thomas M. Britt
Red Bank;
Peter Vanden Basch, Waldwick, both of, N.J.
[21] Appl No 840,871
[22] Filed Apr. 11, 1969
Division of Ser. No. 682,675, Nov. 13, 1967, which is a continuation of Ser. No. 417,332, Dec. 10, 1964, abandoned.
[45] Patented July 13, 1971
[73] Assignee Owens-Illinois, Inc.
Toledo, Ohio

[54] PRECISION CONTROL OF PLASTIC SHEET MANUFACTURE
9 Claims, 7 Drawing Figs.

[52] U.S. Cl. ................................................. 18/14 S
[51] Int. Cl. ...................................... B29d 23/04
[50] Field of Search.. .................................. 18/14 A, 14 C, 14 G, 14 M, 14 R, 14 S

[56] References Cited
UNITED STATES PATENTS

| | | | |
|---|---|---|---|
| 3,160,918 | 12/1964 | Berggren et al. | 18/14 (S) |
| 3,378,614 | 4/1968 | Overcashier | 18/14 (S) X |
| 3,436,442 | 4/1969 | Saks | 18/14 (S) X |
| 3,472,924 | 10/1969 | Sederlund et al. | 18/14 (S) X |

*Primary Examiner*—H. A. Kilby, Jr.
*Attorney*—Sandoe, Hopgood and Calimafde

ABSTRACT: A system for making plastic sheets including a tube extruder and slitting means wherein the extruder is provided with cooling means and air supply means for supporting the extruded tube relative to the appropriate guiding surfaces.

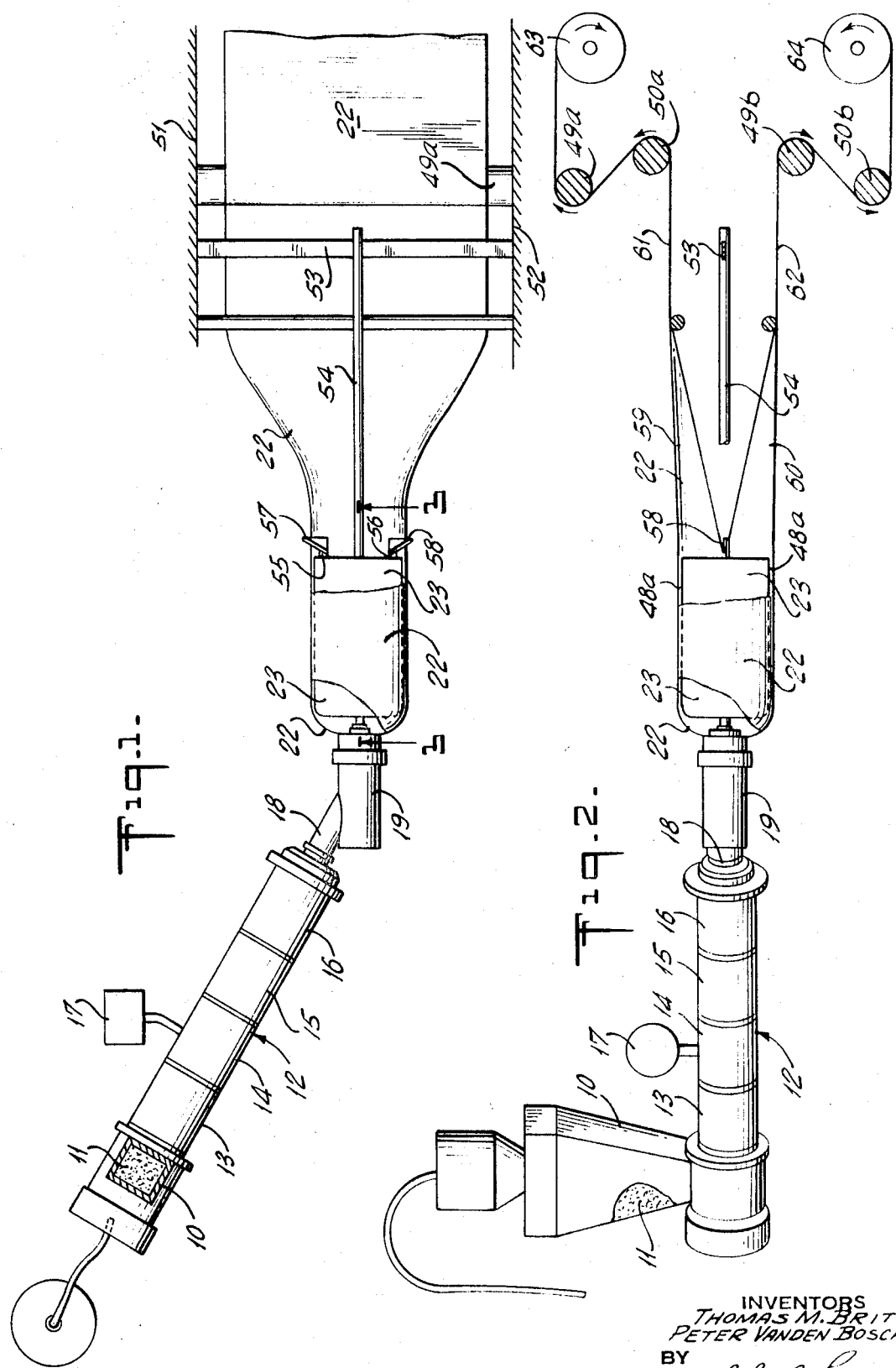

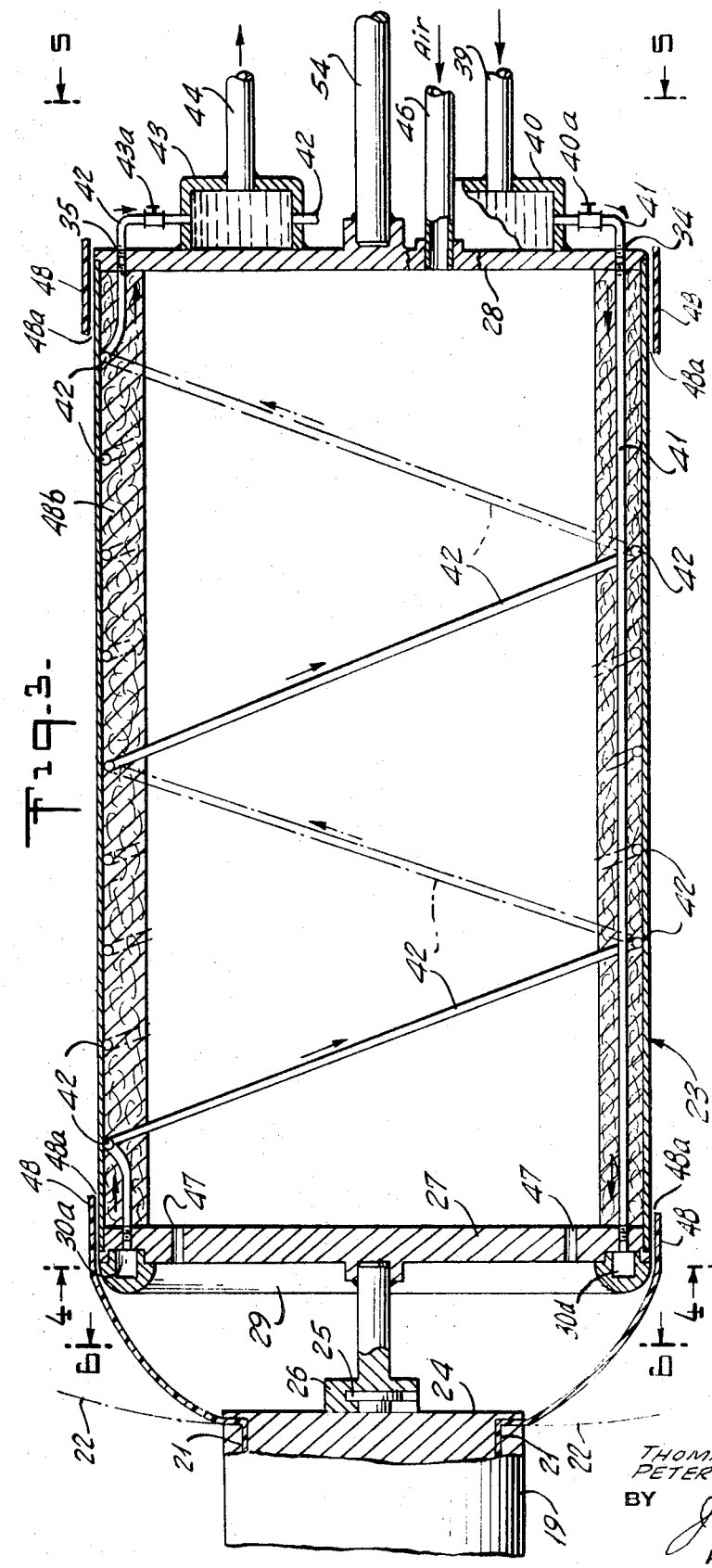

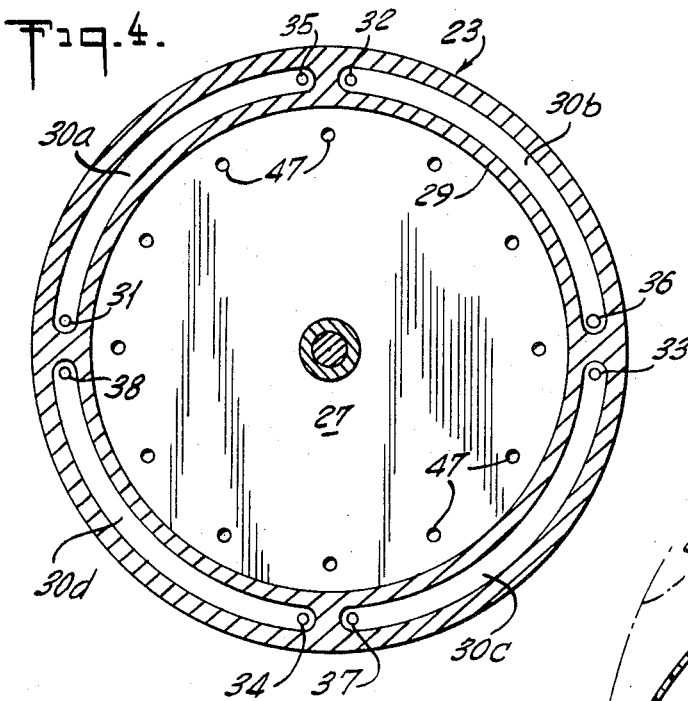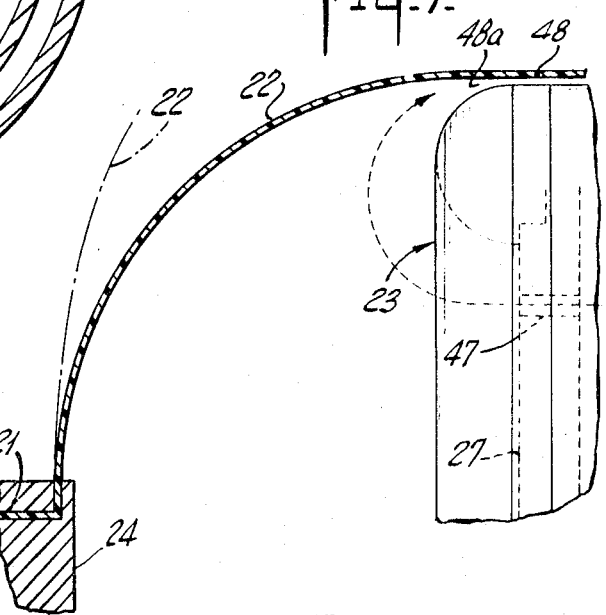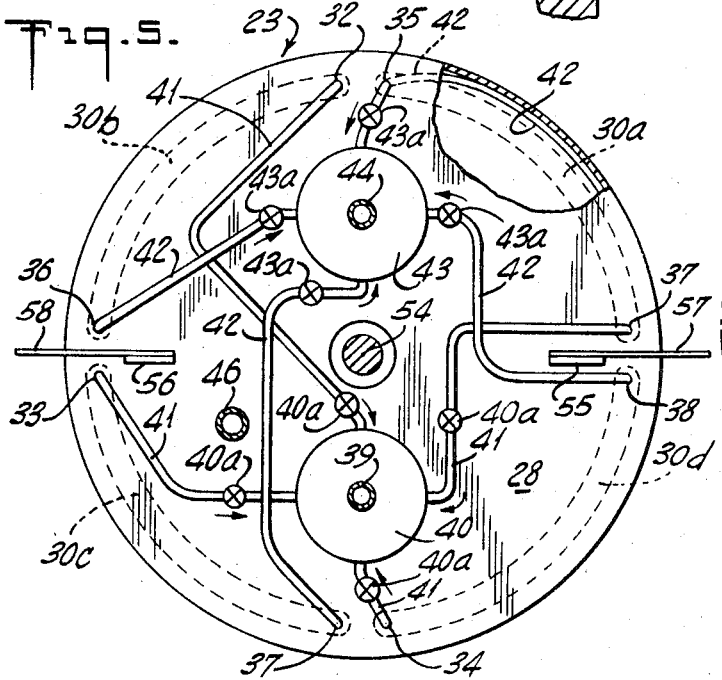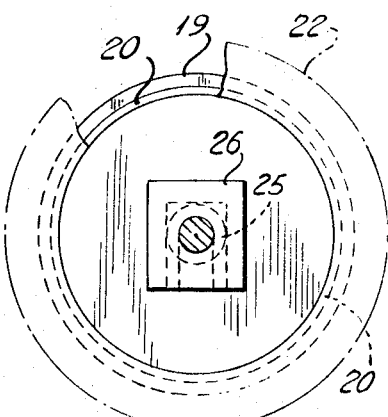

PRECISION CONTROL OF PLASTIC SHEET MANUFACTURE

This application is a divisional application of my copending application Ser. No. 682,675, filed Nov. 13, 1967, of the same title, which is a continuation of my application Ser. No. 417,332, filed Dec. 10, 1964 now abandoned.

This invention relates to plastic sheets and more particularly it relates to precise control over the dimensional characteristics, density, and other physical characteristics of plastic sheets during their manufacture.

A principal object of the invention is to provide a method and system of apparatus to form plastic sheets in large scale production, with the assurance that the physical characteristics such as surface smoothness, sheet density, dimensional size, interior cell formation, and the like can be maintained during the large scale manufacture of such sheets.

Another principal object is to provide an improved apparatus for the manufacture of so-called expanded or cellular plastic sheets.

A feature of the invention relates to a novel device to form expanded or foamed plastic extrudate in successive steps one of which includes the formation of the extrudate into tubular shape and then into two separate flat sheets, while precisely controlling the parameters, such as sheet forming time, shaping and setting temperatures and the like to impart to the finished expanded plastic sheet precisely controlled physical characteristics such as surface smoothness, sheet density, uniform interior cell construction, dimensional accuracy, tensile strength and the like.

Another feature relates to an improved forming block or drum for precision control over the temperature gradient of a foamed or expanded plastic sheet whereby its physical characteristics between an intermediate noncured stage and a final cured stage can be accurately preset.

A further feature relates to an improved forming block or drum for making foamed or expanded plastic sheets, wherein the sheet is first formed as a tubular, partially cured extrudate and is guided along the surface of a cylindrical forming block while maintaining a continuous minute air blanket between the surface of the sheet and the block during its curing operations.

A still further feature relates to the novel organization, arrangement, and relative location and interconnection of parts which cooperate to provide an improved system of apparatus for making expanded or foamed plastic sheets.

Other features and advantages not specifically enumerated will be apparent after a consideration of the following detailed descriptions and the appended claims.

In the drawing which shows one typical embodiment,

FIG. 1 is a top plan view of an expanded plastic sheet foaming system embodying the invention;

FIG. 2 is a front elevational view of FIG 1;

FIG. 3 is an enlarged cross-sectional view of FIG. 1 taken along the line 3-3 thereof;

FIG. 4 is a cross-sectional view of FIG. 3 taken along the line 4-4 thereof;

FIG. 5 is a cross-sectional view of FIG. 3 taken along the line 5-5 thereof;

FIG. 6 is a cross-sectional view of FIG. 3 taken along the line 6-6 thereof;

FIG. 7 is an enlarged view explanatory of certain steps in the formation of the expanded according to the invention.

While the invention finds its primary utility in the manufacture of so-called foamed or expanded plastic of the thermoplastic kind, it will be understood that the invention in certain of its aspects, is equally well applicable to the manufacture of other plastic or elastomeric sheets, whether of the foamed or of the nonfoamed kind or of the thermoset kind. In the manufacture of foamed plastics, certain problems are encountered which are not ordinarily encountered in connection with other kinds of plastics. This is particularly true where the plastic is a polymer such as polystyrene which is to be formed into a pliable or rollable sheet which can be used as a matrix to form various shaped articles by any well-known molding or similar procedure. In order that the finished foamed sheet shall have uniform physical characteristics, such as density, cellular structure, tensile strength, surface smoothness and the like, we have found that it is necessary to control with maximum precision the formation and curing of the extrudate so that it has the desired physical characteristics to enable it to be formed into the desired finished sheet. As the extruded sheet leaves the extruder head it is limp and partially cured but is incapable of being directly formed into sheets with the desired physical characteristics. This limp foamed plastic is then formed into a tubular body which is guided over a special cylindrical forming unit which effects its graduated curing to the final cured state. During this graduated curing, it is necessary that the tubular plastic sheet have its curing temperature precisely controlled so that when it is finally cured it can be slit into two halves to form two separate flat sheets which have identical physical characteristics.

Referring to FIGS. 1 and 2 of the drawing, there is shown a system of apparatus for practicing the invention. It includes a hopper 10 which is supplied from a suitable source with a quantity of the plastic 11 such as polystyrene or other polymerized resin, the resin being in the form of minute pellets or beads having a size, for example, of the order of one-sixteenth of an inch to one-eighteenth of an inch in diameter. The beads are fed by gravity into any well-known extruder 12 which may include an extruding barrel in which rotates a suitable extruding screw (not shown). The extruder may include an input feeder stage to which the hopper 10 is connected, and a series of heated stages 13—16 wherein the beads are transformed into a molten or semimolten uniform mass. The stages 13 and 14 may constitute compression or compacting stages and are maintained at a suitable temperature to melt the pellets. At stage 13 any well known so-called nucleating material may be introduced into that stage such for example as a mixture of sodium bicarbonate or sodium borate and citric acid which upon being heated tends to form minute bubbles of carbon dioxide with the molten resin. At the stage 14 in the extruder a suitable gas, such as normal pentane, is introduced from the source 17 under pressure for example of about 2000—3000 p.s.i. The pentane entering the stage 14 is immediately vaporized and is adsorbed by the molten resinous plastic in that stage, forming therein a multiplicity of fine gas bubbles which are entrapped within the molten resin thus forming a multiplicity of very minute closed gas or vapor cellules in the resin. However, these minute bubbles are not capable of expanding to their larger or final size since the molten extrudate is confined under the extruding pressure within the extruding barrel. By suitable choice of the original particle size of the pellets and the gas pressure, it is possible to control the density of the extrudate and the size of the entrapped cellules therein. It will be understood that this particular manner of forming the closed cellules within the molten resin is merely given as typical and any well-known cellularizing materials and methods may be used for that purpose. The cellularized molten plastic then passes through another heated stage 15 and thence through one or more metering stages 16 at a suitable temperature for example approximately 300° F. Whatever expanding gas or vapor is employed to form the cellules, it should be such as not to be reactive with the viscous resin at the temperatures used at any of the extruding or forming stages.

The extruder 12 has an exit chamber 18 which communicates with a tubular chamber 19 wherein the extruded cellularized plastic is shaped to generally tubular form. The exit end of chamber 19 is provided with an extruding mouth 20, (see FIGS. 3 and 7), from which the extruded material 22 emerges in a somewhat annular disc shape as represented by the dot-dash lines. At this point the extruded cellularized sheet is substantially above the setting and/or curing temperature, 200° F. and is in limp, sheetlike form and only partially cured, although it retains the uniform closed cell formation therein. As the extrudate exits from mouth 20 the pressure is released allowing the previous minute closed bubbles to expand to larger size.

In order to set or cure the plastic while at the same time maintaining its desired physical characteristics, it is As to control with precision its temperature until the plastic reaches its final set or cured stage. For that purpose the plastic emerging from mouth 20 is pulled over the cylindrical forming block or drum 23. Member 23 is mechanically coupled to and supported at the center of the solid face 24 of the member 19 (see FIGS. 3 and 6). The coupling consists of a central circular flange member 25 welded to head 24 and by means of a U-shaped slotted member 26 which is anchored in one end wall 27 of member 23. By this arrangement the member 23 is rigidly supported axially with respect to the die mouth 20 but can be readily lifted therefrom for repair, replacement or the like.

As shown more clearly in FIG. 3, the member 23 is in the form of a hollow metal cylinder which is closed at one end by the wall 27 and at the opposite end by wall 28. Attached to the front side of wall 27 is an annular header 29 having four quadrantal interior manifolds 30a, 30b, 30c, 30d which are closed by the adjacent surface of wall 27. The external surface of header 29 is smoothly rounded and is smoothly continuous with the external cylindrical surface of member 23. The wall 27 is provided with a series of four inlet ports 31, 32, 33, 34 (see FIG. 4) and a corresponding series of outlet ports, 35, 36, 37, 38.

The arrangement is such that each quadrantal manifold section can be controlled individually for the flow of water or other cooling medium therethrough. For that purpose there is provided a main water inlet pipe 39 which leads into a four-port manifold 40 each of the ports from manifold 40 being connected through a respective control valve 40a—40d and thence through a length of straight pipe 41a—41d to an inlet port of a corresponding one of the quadrantal sectors. This as shown in FIG. 3 the pipe 41c connects with the inlet port 34 of manifold 30c. The outlet port of each of the quadrantal manifolds is connected to a respective helically coiled pipe 42a—42d each of these helical pipes being in contact with the inner surface of drum 23 (see FIG. 3). The outlet end of each of these coiled pipes is connected through a respective control valve 43a—43d to a corresponding four-port manifold 43 which is connected to the main outlet pipe 44. Thus by means of the valves 40a—40d and 43a—43d any one or more of the quadrantal manifold sections can be subjected to the cooling water flowing therethrough and likewise the corresponding portion of the drum 23 is controllably subjected to the cooling water. By this arrangement it is possible to control selectively the cooling gradient along the length of member 23. We have found that this selective control of the temperature gradient along the length of member 23 is necessary in order to insure that the cellularized plastic in subjected to the desired temperature curing as it is moving along the member 23. It has been found that if only one cooling manifold were used and extending around the member 23, instead of separate manifolds 30a—30d, the heat of the plastic as it contacts the left-Hand end of member 23 would be so great as to prevent the temperature at that region being brought down to the desired level. Furthermore, if as sometimes happens, the temperature is not uniform around the entire periphery of the extruded sheet, it may be necessary to lower the temperature at some particular sector thereof. That result is obtainable by selectively controlling the flow of cooling water through the corresponding sector of the plural sector manifold at the left-Hand end of member 23.

As hereinabove mentioned, when the cellularized plastic 22 initially exits from the die mouth 20 it is in annular disc form and is limp and only partially cured. At this point an attendant grasps the limp plastic and pulls it to tubular shape along the length of member 23. In other words, the extruded plastic bridges the space between the die head 20 and the left-hand end of member 23 to form a closed chamber therebetween bounded by the extruded sheet. It should be observed that the member 23 is connected to an air pressure inlet pipe 46 and the wall 27 is provided with a series of air vent holes 47. Consequently when the attendant pulls the limp plastic over the rounded end of member 23 and along that member, the air from pipe 46 is forced through the openings 47 and forms the semicured plastic 22 into a somewhat bubble shape as indicated in the enlarged view of FIG. 7. In accordance with one feature of the invention, the air pressure is correlated with the plasticity of the limp plastic so that the plastic retains the curved or bubblelike shape at the bridging region, but then proceeds along member 23 as a tubular portion 48 which is approximately of the same diameter as the external diameter of member 23. However, the air emerging from the openings 47 is guided by the curved portion of the plastic 22 and is directed as indicated by the dotted arrow in FIG. 7, to form a minute air blanket 48a between the external surface of member 23 and the plastic 22. This blanket may have thickness of the order of 10 mils, and prevents frictional contact between the surface of member 23 and the plastic. Furthermore, it provides a more precise control over the curing temperature gradient. In order to isolate as far as possible heat interchange between the air inside the member 23 and the surface of that member, a lining of heat insulation such as glass wool 48b may be provided.

Mounted in alignment with member 23 (see FIGS. 1 and 2) are a series of power driven rolls 49a, 50a, 49b, 50b which are driven in the direction of the arrows, the said rollers being supported in suitable bearings (not shown) in upright frames 51, 52. Anchored across said frames between the rollers 49b and 50a is a rigid rod 53 through which slidably passes a rigid rod 54 fastened centrally to drum wall 28. This rod therefore supports the said drum in its axial alignment with the die member 19. Also rigidly attached to the end wall 28 are a pair of diametrically opposite arms 55, 56. Fastened to each of these arms is a respective knife blade 57, 58 having its knife edge facing the wall 28, as shown in FIG. 1, but inclined outwardly from the wall 28. The blades 57 and 58 are thus located in a horizontal plane passing through the longitudinal axis of member 23 and parallel to the rollers 49a, 50a, 49b, 50b.

The purpose of the blades 57, 58 is to slit the emerging tubular cured plastic 22 into two equal halves 59, 60 (see FIG. 2), which are then led around the respective sets of rolls 49a 50a, and 49b 50b. As stated hereinabove, the attendant initially pulls the plastic along the length of member 23 and thence past the knife edges 57 and 58, thus dividing it into two symmetrical halves with flat portions 61, 62 which are then led around the power driven rolls whereupon those rolls continue to pull the plastic along the length of member 23 and also effects the subdivision thereof into the respective flat sheet portions 61, 62. During this continuous pulling by the power driven rolls of the cured plastic along the forming drum 23 there is always maintained an entrapped air blanket around the periphery of member 23 and on which blanket the plastic rides. The existence of this blanket reduces the friction between the traveling plastic and member 23 and by reason of the selective control of the temperature along the length of member 23 as hereinabove mentioned, it is possible to accurately control the curing time and density of the cellularized plastic as it passes along the length of member 23, as well as its surface finish. It should be observed that by the time the cellularized plastic leaves the member 23 it is almost but not fully cured so that the continued pulling by the power rolls acts to more uniformly orient the cells in across the width and length of the sheet. After leaving the pull rolls, the two flat sheets are wound on the receiving rolls at which time the sheets are fully cured or set. By controlling the quantity and flow of the cooling water it was found possible to control the temperature of member 23 so that as the plastic reaches the left-hand end of member 23 the temperature at that region is approximately 150° F. whereas when the plastic leaves the right-hand end of member 23 it is not fully cured and is at a temperature for example of approximately 120° F. It will be understood, of course, that the temperature gradient can be controlled by means of the valves and cooling arrangements shown, to select the temperature gradient along member 23 in correlation with the curing schedule of the particular plastic that is being manufactured. It has been found that in order to preserve the uniform cellular interior construction of the plastic and to insure its uniform density and stiffness as it is leaving the member 23, the above described temperature control is critical with respect to any given plastic. Furthermore, it has been found that with this method of making the finished flat cellularized plastic sheets, it is possible to control the dimensional tolerances and other physical characteristics of the finished product within precise limits.

While certain specific materials and temperatures have been referred to herein, it will be understood that they are given merely as illustrative and not by way of limitation. In any event by means of the temperature control hereinabove mentioned, it has been found possible to subject the cellularized plastic as it is passing along the forming drum 23 to such control that any desired curing schedule may be achieved in making the final product. This time of course can also be controlled by varying the speed at which the plastic passes along the member 23. Furthermore the plastic during the curing operation is subjected to uniform tensile forces both around the member 23 and along its length. It has been found that the provision of the air blanket 48a prevents the almost completely cured plastic 48 from bending on the drum 23 at its exit or right-hand end. The plastic as it is reaching its cooled condition tends to contract and, would otherwise contract and grip the drum 23, to such an extent that when pulled by rollers 49a, 50a, 49b, 50b, it could very easily be ruptured.

While reference has been made to polystyrene as the preferred plastic it will be understood that any other similar thermoplastic polymer material may be employed, wither along or as a copolymer with other materials. For example the extrudate may be either a homopolymer or copolymer of vinyl resins or halogenated derivatives thereof, and also including styrene whether methyl or dimethylstyrene, methacrylates, or polymers or copolymers of vinyl chloride, vinyl acetate, polyethylene, polycarbonates and the like.

We claim:

1. In a system for making plastic sheets, the combination of an extruder for extruding the plastic in partially cured condition, a cylindrical forming drum incorporating means for sector temperature control to receive and support the plastic therearound in generally tubular shape, means to maintain an air blanket between said tubular plastic and the surface of said forming drum and means to subject said tubular plastic while on said forming drum to a controlled cooling as it is fed along said drum, comprised of a divided annular manifold about the end of said drum facing said extruder, means to supply said manifold with a cooling medium, and means to individually control the flow of said cooling medium to each division of said manifold, whereby the temperature of the radial sectors of said end of said drum corresponding to the divisions of said annular manifold may be varied to compensate for variation in temperature of the extrudate in proximity thereto.

2. A system according to claim 1 in which said extruder has a radial extruding die mouth for extruding the partially cured plastic as an annular sheet, and said forming drum is a hollow drum to receive said sheet in tubular form and to support it in such tubular form during its feeding movement along said forming unit.

3. A system according to claim 1 in which slitting means are attached to said forming drum and protrude therefrom to divide said tubular sheet into two separate sheets after leaving said forming drum.

4. A system according to claim 1 in which said forming unit is a hollow tubular member, and said means for maintaining said controlled cooling includes a plurality of helical cooling coils each connected to a division of said manifold and extending the length of said drum, and means to supply said manifold and coils with a cooling medium.

5. A system according to claim 4 in which said manifold divisions are separately connected to said supply of cooling medium, whereby the temperature around said forming drum can be selectively controlled in discrete annular sections about the periphery facing the extruder to correlate them with the temperature of said plastic to effect precisely controlled curing of said plastic.

6. A system according to claim 5 in which the interior of such forming drum is connected to a source of air under pressure, and one end wall of said forming drum is provided with a series of air vents to maintain said plastic in a smoothly rounded contour in the region where it is bridged between the extruder and the forming drum, said air being insulated from said cooling coils.

7. The combination of a radial extruder for extruding plastic in an annular sheet, an axial forming drum disposed opposite said extruder to receive therearound said annular sheet, air supply means to expand said annular sheet to the diameter of said forming drum and to provide an air blanket between the extrudate and said drum prior to being led therein, a plurality of power driven pull rolls, said forming drum being located between said extruder and said pull rolls, the end of said forming drum facing said extruder being provided with a series of sector manifolds each of which is provided with individual connections to the source of a cooling medium, whereby the temperature of said end of said drum may be selectively controlled in various regions surrounding it, means including said pull rolls to pull said extruded plastic in tubular form along the surface of said forming drum, at least one cooling manifold surrounding the end of said forming drum which faces said extruder, means to supply said manifold with a cooling medium, and additional means to supply the interior of said forming unit with a cooling medium extending along the length thereof.

8. The combination according to claim 7 in which each of said sector manifolds has a pair of inlet and outlet pipes connected to the source of cooling medium, and control valves associated with each of said pipes.

9. The combination according to claim 8 in which a corresponding plurality of parallel helical pipes disposed adjacent the inner surface of said drum are connected between the inlet and outlet pipes for said manifolds for selectively controlling the temperature of the forming drum along the length thereof.